US008001419B2

(12) United States Patent
Killian et al.

(10) Patent No.: US 8,001,419 B2
(45) Date of Patent: Aug. 16, 2011

(54) ENERGY STORAGE MODULE

(75) Inventors: Daniel E. Killian, Eastlake, OH (US); Douglas R. Bodmann, Shaker Heights, OH (US); Dale R. Terdan, Concord Township, OH (US); Ronald E. Schultz, Solon, OH (US); James J. Kay, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 305 days.

(21) Appl. No.: 12/241,875

(22) Filed: Sep. 30, 2008

(65) Prior Publication Data
US 2009/0125156 A1 May 14, 2009

Related U.S. Application Data

(60) Provisional application No. 60/987,622, filed on Nov. 13, 2007.

(51) Int. Cl.
 *G06F 11/00* (2006.01)
(52) U.S. Cl. .......................... 714/14; 714/5.1
(58) Field of Classification Search ...................... 714/14
 See application file for complete search history.

(56) References Cited

U.S. PATENT DOCUMENTS

| 5,077,572 | A | * | 12/1991 | Morisawa | 396/539 |
|---|---|---|---|---|---|
| 5,193,176 | A | * | 3/1993 | Brandin | 714/14 |
| 5,448,719 | A | * | 9/1995 | Schultz et al. | 714/5 |
| 5,784,548 | A | * | 7/1998 | Liong et al. | 714/6 |
| 5,832,282 | A | * | 11/1998 | Pate et al. | 713/300 |
| 5,889,933 | A | * | 3/1999 | Smith | 714/22 |
| 5,944,828 | A | * | 8/1999 | Matsuoka | 713/323 |
| 6,079,026 | A | * | 6/2000 | Berglund et al. | 713/340 |
| 6,275,946 | B1 | * | 8/2001 | Meir | 713/300 |
| 6,535,996 | B1 | * | 3/2003 | Brewer et al. | 714/14 |
| 6,567,899 | B2 | * | 5/2003 | Ghosh et al. | 711/156 |
| 6,888,267 | B2 | * | 5/2005 | Floro et al. | 307/66 |
| 7,414,854 | B1 | * | 8/2008 | Douglas | 361/752 |
| 7,634,688 | B2 | * | 12/2009 | Madter et al. | 714/24 |
| 2004/0190210 | A1 | * | 9/2004 | Leete | 361/90 |
| 2004/0210406 | A1 | * | 10/2004 | Bui et al. | 702/63 |
| 2007/0035275 | A1 | * | 2/2007 | Yang et al. | 320/112 |
| 2008/0084185 | A1 | * | 4/2008 | Nakazawa | 320/128 |
| 2008/0179951 | A1 | * | 7/2008 | Brune et al. | 307/31 |
| 2009/0037768 | A1 | * | 2/2009 | Adams | 714/14 |
| 2010/0146333 | A1 | * | 6/2010 | Yong et al. | 714/14 |

* cited by examiner

*Primary Examiner* — Scott T Baderman
*Assistant Examiner* — Kamini Patel
(74) *Attorney, Agent, or Firm* — Fay Sharpe LLP; R. Scott Speroff; John M. Miller

(57) ABSTRACT

An industrial automation controller module includes a main module and an energy storage module (ESM) releasably connected to the main module. The ESM includes a back-up electrical power source such as a battery or a capacitor that is electrically connected to processor circuitry of the main module when the ESM is physically connected to the main module. In case of interruption of operating power to the processor circuitry of the main module, the back-up power source of the ESM supplies back-up power to the main module to allow for completion of an emergency save operation to save data to non-volatile memory in the main module. If the ESM includes a capacitor back-up power source, it is charged by the main module and the capacitor charge is dissipated if the ESM is separated from the main module. In all cases, the ESM can include one or more configuration parameters stored therein that allow the main module to validate (or not) the ESM for the requirements of the main module, with respect to type of back-up power source, product code or model, capacity of back-up power source, and the like. The main module can also initiate periodic testing of the back-up power source of the ESM.

48 Claims, 5 Drawing Sheets

ENERGY STORAGE MODULE

CROSS-REFERENCE TO RELATED APPLICATION

This application claims priority from and benefit of the filing date of U.S. provisional patent application Ser. No. 60/987,622 filed Nov. 13, 2007 and entitled Energy Module, Embedded Memory and Display, and said provisional application Ser. No. 60/987,622 is hereby expressly incorporated by reference herein.

BACKGROUND

Industrial automation controllers are special purpose computers used for the control of industrial machines and/or processes. While executing a stored program, they read inputs from one or more controlled machines/processes and, according to the logic of a contained control program, provide outputs to the same and/or different controlled machine(s)/process(es) based upon the inputs. Industrial controllers must provide "real-time" control (i.e., control in which control outputs are produced predictably and timely in response to given control inputs), and must provide for extremely reliable operation and recovery from faults. In this latter regard, critical data contained in processor registers and other volatile memory (e.g., DRAM, SRAM, SDRAM, etc.) of the controller must be saved or "backed-up" to a non-volatile memory (e.g., flash EEPROM, disk, etc.) in the event of loss of electrical power. Heretofore, this back-up operation has been performed under power supplied by a back-up power source integrated into the controller, typically a replaceable battery (e.g., a 3 volt lithium battery) or a capacitor permanently connected to the controller circuitry and permanently housed within the controller module.

FIG. 1 (prior art) shows an example of such an industrial automation controller 10 including a chassis 12 incorporating a number of modules 14, 16, 18, and 20 operably interconnected by means of a modular or fixed size backplane 22. In particular, a power supply module 14 receives electrical line power 24 as input (e.g., about 120 volts AC) and outputs operating power (e.g., about 5 volts DC) for distribution along the backplane 22 to the other modules 16, 18, and 20. A controller module 16 receives data along the backplane 22 from a network module 18 and at least one I/O module 20. The network module 18 provides an interface with a communication network 35 such as EtherNet, or ControlNet to receive system control data or data from other I/O modules and to allow data to be transmitted to/from other devices on the communication network 35. The I/O module 20 provides an interface for input and output signals along I/O lines 27 communicating with the controlled process or machine. Generally, during operation of the industrial controller 10, a program executed by the controller module 16 reads input data from the I/O module(s) and creates output data that are then sent along the backplane 22 to the network module 18 or to an I/O module 20. The controller module 16 includes at least one internal processor circuit board (main circuit board) 26 containing a battery or capacitor back-up electrical power source 28, volatile memory 30, and processor circuitry 32. The processor circuitry 32 comprises one or more suitable electronic controller or microprocessor devices such as an ASIC or a general purpose microprocessor that executes a stored control program, a programmable logic controller and/or the like. The battery may be a lithium battery as is generally known in the art. Such batteries are typically not rechargeable and hence must be replaced when their reserve power is below a minimum threshold. A capacitor back-up power source 28 can alternatively be used, but is not replaceable by the end-user and can lose energy capacity by exposure to long-term elevated temperatures. The volatile memory 30 can be, e.g., (synchronous) dynamic random access memory (S)DRAM that requires application of power to maintain its data integrity. Non-volatile memory 34 such as flash memory or disk is also provided. In the event of loss of operating power in the backplane 22 (e.g., due to interruption of the input line power 24 to the power supply module 14), the battery or other back-up power source 28 outputs a required back-up power to the controller module 16 to allow for completion of an "emergency save" operation in which the processor circuitry 32 saves its state (i.e., content of its registers and other volatile memory) and also saves data from the volatile memory 30 to the non-volatile memory 34 using the back-up power supplied by the back-up power source 28.

Whether the back-up power source 28 is a battery or a capacitor, these prior back-up power sources 28 have been integrated into the controller module 16 such that a switch from one type of back-up power source to another type by an end-user (e.g., from battery to capacitor) or replacement of the back-up power source is not possible. Such a switch might be required if the controller module 16 is to be moved from one environment (e.g. a factory) to another (e.g., a mine) where batteries are not allowed. Furthermore, battery replacement in these prior controllers requires that the housing of the controller module 16 be opened through an access door or the like to allow the old battery 28 to be disconnected from and the new battery connected to the controller module 16. This prior battery replacement operation is sometimes difficult or inconvenient or excessively time-consuming in an industrial environment, can be unsafe due to potential exposure to high-voltage electronics, and can require the controller module to be powered down during the replacement process. It is important to reduce the time required to replace a back-up power source to account for the possibility of a power failure occurring during the replacement operation and to allow for replacement of a controller back-up power source during controller operation. Also, if a back-up power source replacement operation is too difficult or inconvenient, it is possible that an end-user will not periodically replace the back-up power source as required.

In light of the foregoing, it has been deemed desirable to provide an energy storage module for an industrial automation controller, and an industrial automation controller module including such an energy storage module, wherein the energy storage module includes any desired suitable back-up energy source and wherein the energy storage module is specially adapted to ensure safe and reliable operation of itself and the industrial automation controller module to which it is mated.

SUMMARY

In accordance with one aspect of the present development, an industrial automation controller module includes a main module comprising processor circuitry, volatile memory, and non-volatile memory, wherein the processor circuitry, volatile memory, and non-volatile memory are electrically powered by operating power. The controller module further includes an energy storage module removably connected to the main module and adapted for selective manual separation from the main module. The energy storage module includes a back-up power source. The back-up power source of the energy storage module selectively supplies back-up power to the processor circuitry, volatile memory and non-volatile memory of the main module for an emergency save operation in which data from at least one of the processor circuitry and the volatile memory are saved to the non-volatile memory in response to interruption of the operating power.

In accordance with another aspect of the present invention, a removable energy storage module includes a housing configured for selectively releasably mating with an associated main module. A back-up power source is supported by the housing. A first connector is operatively connected to the back-up power source and is adapted to mate with a second connector of the associated main module for electrical transmission between the associated main module and the energy storage module. The back-up power source of the energy storage module selectively supplies back-up power to the associated main module for completing an emergency save operation in which the associated main module saves data to non-volatile memory.

In accordance with another aspect of the present invention, a method of supplying back-up power to processor circuitry of a main module of an industrial automation controller module for the processor circuitry to complete an emergency save operation includes physically connecting an energy storage module to the main module and electrically connecting a back-up power source and back-up power circuitry of the energy storage module to the processor circuitry of the main module. The method further includes receiving a signal from the processor circuitry of the main module into the back-up power circuitry of the energy storage module that back-up power from the back-up power source is required for an emergency save operation and, in response to the signal, supplying back-up power from the back-up power source to the processor circuitry of the main module for the emergency save operation.

DETAILED DESCRIPTION

Figure 1:
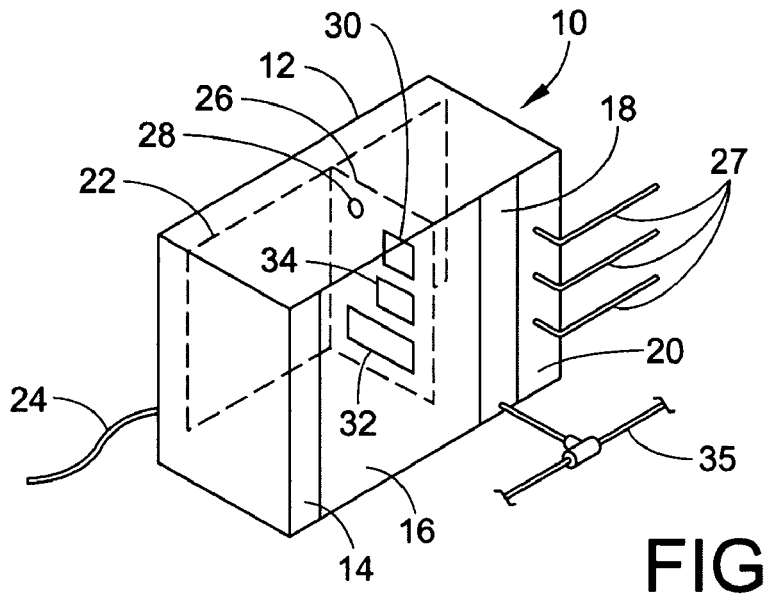
FIG. 1 (prior art) is a simplified, perspective view of an industrial automation control system including a controller module with a conventional internal back-up power source used for saving the state of the controller module in case of loss of power.
Figure 2:
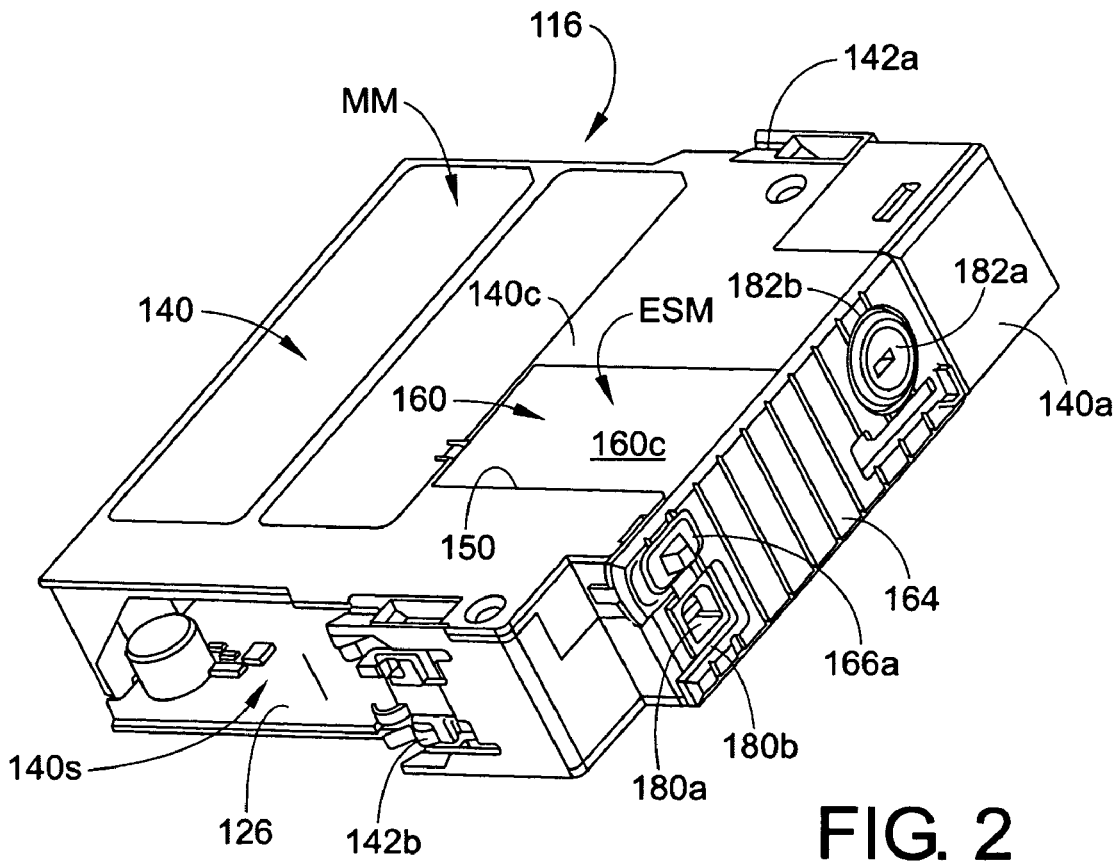
FIG. 2 is an isometric view of a controller module including a removable and replaceable energy storage module in accordance with the present development.
Figure 3:
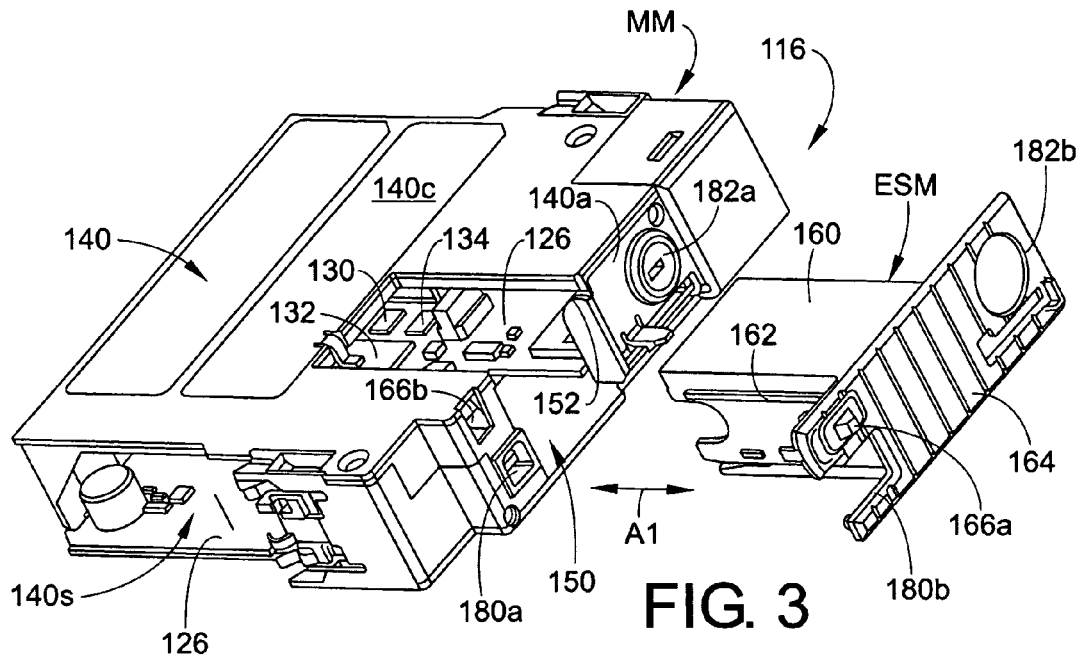
FIG. 3 is similar to FIG. 2, but shows the energy storage module in the state where it is separated from the main module portion of the controller module.

A controller module 116 formed in accordance with the present development is shown in FIG. 2. Except as otherwise shown and/or described herein, the controller module 116 is identical to the controller module 16 of FIG. 1, and like reference numbers that are 100 greater than those used in FIG. 1 are used to identify like components.

In place of the conventional back-up electrical power source 28 used in the controller module 16 of FIG. 1, the controller module 116 comprises a removable and replaceable energy storage module (ESM), indicated by ESM in the drawings. FIG. 2 shows the controller module 116 including its ESM operatively installed. As described in detail below, when the ESM is operatively installed, the ESM is adapted to output sufficient electrical back-up power to controller module 116 during a loss of operating power on the backplane 22 so that the emergency save operation can be completed in which the state of the processor circuitry 132 (its registers and other volatile memory) and any other volatile memory 130 of the controller module 116 can be saved to non-volatile memory 134 such as flash EEPROM, disk, or the like, along with a cyclic redundancy check or checksum to validate the saved data. The data saved to the non-volatile memory 134 can be used in rebooting the controller module 116, fault analysis, etc. Also, as described below, the ESM optionally includes a real-time clock (RTC) with a non-volatile memory (e.g., EEPROM) and a separate back-up power supply dedicated to the real-time clock. The processor circuitry 132 is sometimes referred to as a "processor" comprises one or more suitable electronic controller or microprocessor devices such as an ASIC or a general purpose microprocessor that executes a stored control program, a programmable logic controller and/or the like.

Referring to all of FIGS. 2-5, the controller module 116 comprises a main module MM and the energy storage module ESM connected thereto. The main module MM comprises a main housing 140 defining a space 140s in which the main circuit board 126 is contained (the main circuit board 26 can comprise one or multiple circuit boards). The main housing 140 comprises at least one mounting clip (as shown first and second mounting clips 142a,142b) that are adapted to mate selectively and releasably with a chassis, rail, enclosure or other mounting location in which the controller module 116 is operatively installed during use, with the main circuit board 126 operatively mated to a backplane through a multi-pin plug-type connector 144 (for transmission of electrical power and data). For example, the main housing 140 can be mounted to the chassis 12 of FIG. 1 and operatively connected to the backplane 22 via plug connector 144 for receiving operating power from the backplane 22 and for sending/receiving data along the backplane 22. It is not intended that the present development be limited to any particular type of installation environment for the controller module 116. The controller module 116 can be designed to be installed in a fixed-size chassis having a fixed-size backplane defined in the chassis, or the backplane can be modular (with or without a chassis or mounting rail for physically mounting the controller module 116) such that the backplane is defined and expanded by each module (power supply 14, controller module 116, network adapter 18, i/o module(s) 20) added to the system.

The main housing 140 of the controller module 116 typically comprises multiple pieces and includes or defines a slot or other opening 150 adapted to receive and retain the ESM as shown in FIG. 2. The ESM can be selectively manually inserted into and separated from the main housing 140 as indicated by the arrow A1 in FIGS. 3 and 4. The slot 150 opens through a front wall 140a and a side wall 140c of the main housing 140. The slot 150 is adapted to receive the ESM in only one orientation, preferably with sliding fit through a front wall 140a of the housing. Accordingly, the housing 140 defines the slot 150 to include one or more mechanical features 152 that must be mated with corresponding mechanical features 162 on the ESM in order for the ESM to be slidably received. In the illustrated example, the slot 150 is defined with one or more axially extending grooves and/or ribs 152 that are adapted to mate slidably with respective axially extending ribs and/or grooves 162 defined by a body 160 of the ESM. The slot 150 is designed with the at least one mechanical feature 152 such that only an ESM having the mating mechanical feature(s) 162 can be operatively received therein.

Figure 4:
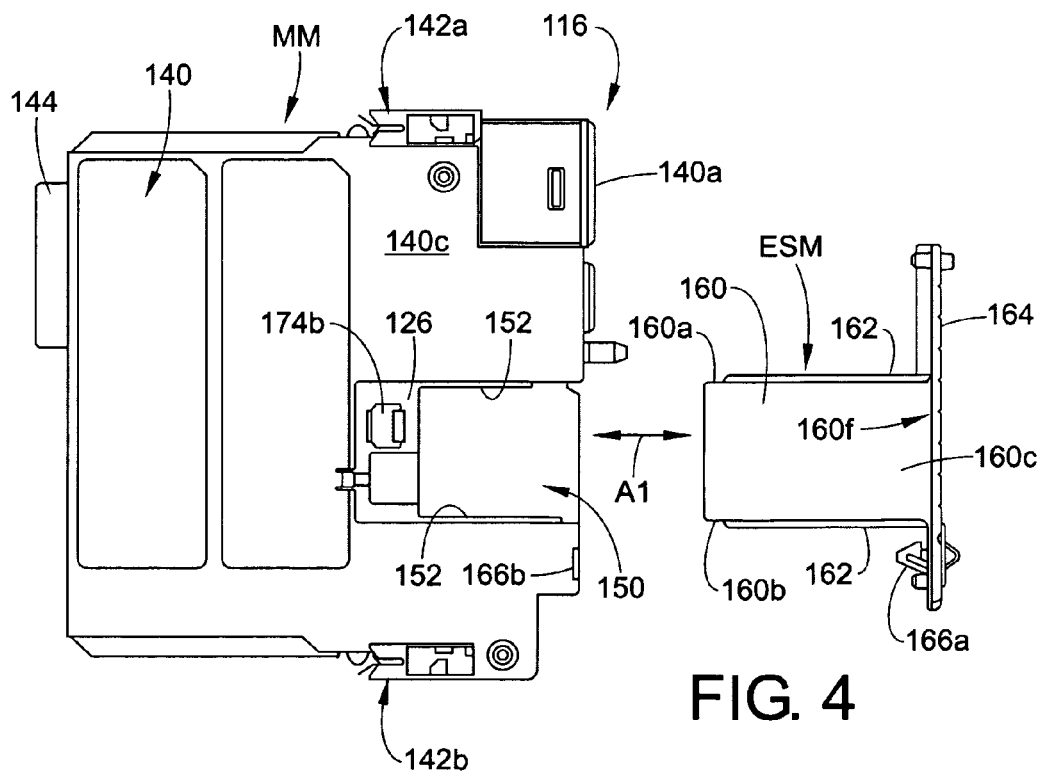
FIG. 4 is similar to FIG. 3, but shows a left side view of the controller module, with the energy storage module portion in its disconnected state.
Figure 5:
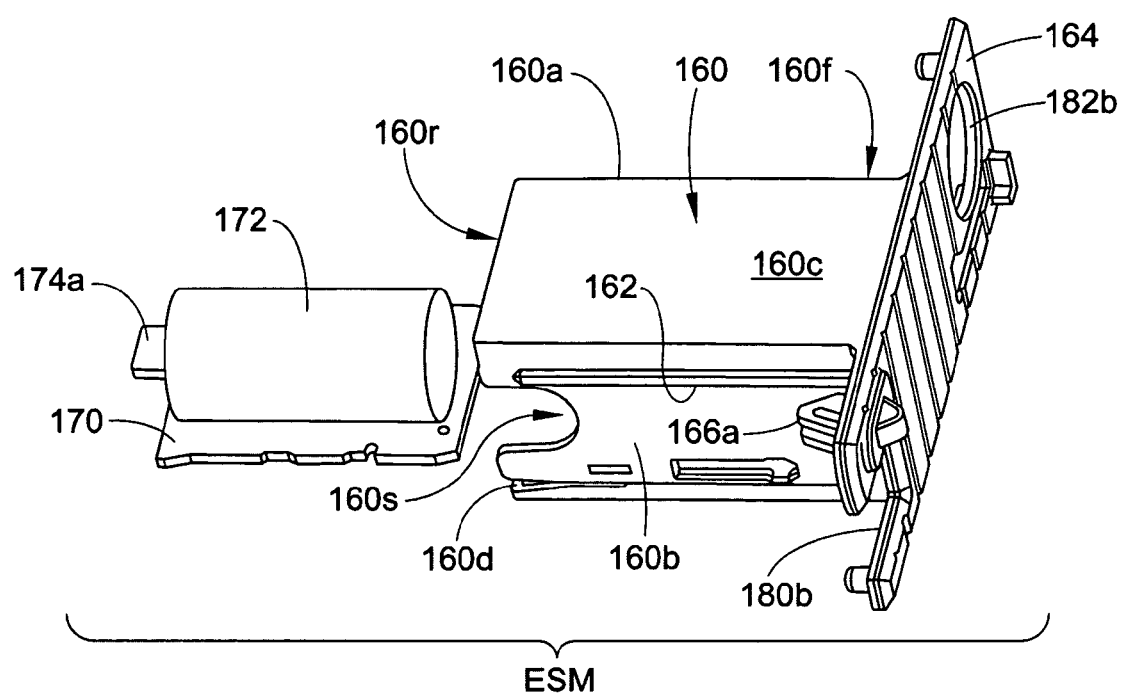
FIG. 5 is an exploded isometric view of the energy storage module.

Referring specifically to FIGS. 4 and 5, the ESM body 160 comprises a hollow tubular or box-like structure defined by spaced-apart upper and lower walls 160*a*,160*b* and spaced-apart left and right side walls 160*c*,160*d* extending between and interconnecting the upper and lower walls. A face plate 164 is connected to and closes a front end 160*f* of the body and the rear end 160*r* of the body is open to the space 160*s* defined between the walls 160*a*,160*b*,160*c*,160*d*. The ESM includes an ESM circuit board 170 carried by its body 160 in the space 160*s* (the ESM circuit board 170 can comprise one or multiple circuit boards). The ESM circuit board 170 comprises a back-up electrical power source 172 (shown as a capacitor but that could be a battery or other suitable source of back-up electrical power) connected thereto, along with additional electronic components described below. The ESM circuit board 170 further comprises at least one multi-pin plug connector 174*a* adapted to mate with a corresponding plug connector 174*b* (FIG. 4) connected to the main circuit board 126 in the housing 140 when the ESM is operatively mated with the slot 150 as shown in FIG. 2. As such, when the ESM is operatively installed in the ESM slot 150, the connectors 174*a*,174*b* mate for exchange of electrical power and data signals between the ESM circuit board 170 and the main circuit board 126, and when the ESM is removed from the ESM slot 150, the connectors 174*a*,174*b* are disconnected from each other.

When the ESM is fully installed in the slot 150 as shown in FIG. 2, the left side wall 160*c* thereof lies flush with the left side wall 140*c* of the controller module main housing 140, preferably with minimal space between the ESM wall 160*c* and main housing wall 140*c* so that the ESM wall 160*c* blocks access to the main module space 140*s* through the slot 150.

The ESM preferably comprises a latch 166*a* connected to its face plate 164 and adapted to mate with a catch 166*b* defined by the main housing 140. When the ESM is mated with the main housing 140, the latch 166*a* mates with the catch 166*b* so that the ESM is captured to the main module housing 140 by the latch 166*a*. The latch 166*a* is selectively manually releasably to allow separation of the ESM from the main module housing 140, e.g., the latch is defined as a one-piece resilient polymeric structure with the face plate 164 and/or includes a separate biasing spring or the like.

The ESM face plate 164 is conformed and dimensioned so as not to obstruct certain features/structures of the main module MM. For example, the main module MM includes a USB data port 180*a* located in the front wall 140*a* of the main housing 140, and the face plate 164 includes a corresponding opening 180*b* to accommodate same. Similarly, the main module MM comprises a key switch 182*a* adapted to receive a key to control operation of overall control module 116 (on/off/test/program/etc.). The ESM face plate 164 includes a corresponding key switch opening 182*b* adapted to accommodate the key switch 182*a* to allow use of the key switch 182*a* when the ESM is operatively installed. Furthermore, the key switch opening 182*b* is conformed and dimensioned to lie closely adjacent or completely surround the key switch 182*a* such that any key in the key switch 182*a* must be removed from the key switch before the ESM can be separated from the main module MM, i.e., any key in the key switch will interfere with the face plate 164 of the ESM if removal of the ESM is attempted without first removing the key from the key switch 182*a* (which helps to ensure that the key will not be turned to change the state of the key switch while the ESM is separated from the main module MM).

Figure 6:
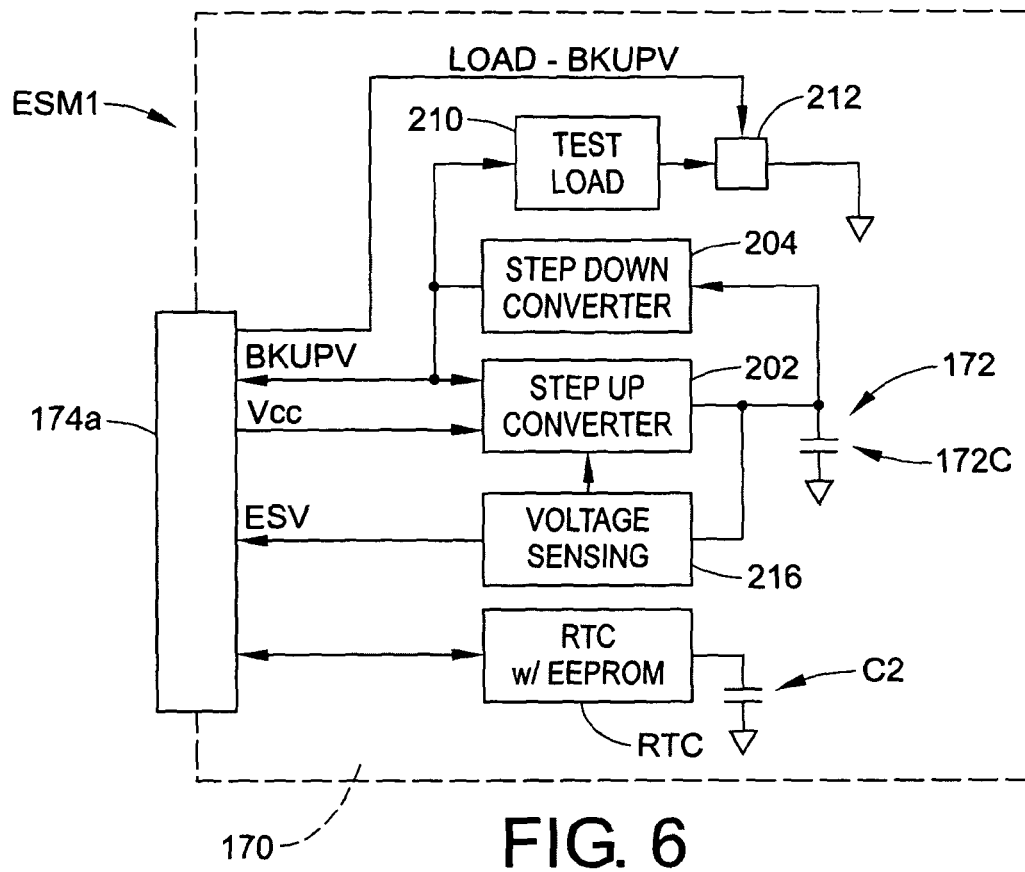
FIG. 6 is a block diagram view of the energy storage module as configured with a capacitor as the back-up electrical power source.

FIG. 6 shows a diagrammatic view of a capacitor embodiment of the ESM, designated ESM1. More particularly, the ESM back-up power source 172 comprises a capacitor 172C that charges from operating power supplied from the main module MM during ordinary operation of the controller module 116, and that supplies back-up power to the controller module 116, including the main circuit board 126 and processor circuitry 132 and other components of the main module MM (and the ESM itself) in case of loss of operating power on the backplane 22 (due to interruption of the line power 24 input to the power supply module 14 or another cause) so that the emergency save operation can be completed as described above. As noted above, the ESM circuit board 170 includes back-up power circuitry connected to the main circuit board 126 of the main module MM through a plug interface 174*a*/174*b*.

More particularly, ESM input electrical power Vcc (e.g., 4.75 to 5.25 volts) is supplied to the ESM circuit board 170 sourced from the backplane operating power. The ESM input voltage Vcc is input to a step up converter 202 that increases the voltage to a charging voltage that is output to the capacitor 172C for charging the capacitor. In one example, the capacitor is rated to 400 volts and the step up converter outputs 350 volts for charging the capacitor 172C. Likewise, the capacitor 172C stores a back-up voltage that is output through a step down converter 204 that supplies the back-up operating voltage BKUPV (e.g., 4 to 5 volts DC) to the controller module 116 to complete the emergency save operation. In one example, the step up converter and step down converter can be provided by respective flyback transformers.

In one embodiment, the ESM comprises a test load 210 (e.g., a resistor) and switch means 212 controlled by the processor 132 of the main circuit board 126 by a signal LOAD_BKUPV for selectively powering the test load 210 from the step down converter 204 to measure the reserve power of the capacitor 172C during a test mode. A voltage sensor 216 monitors the voltage of the capacitor 172C during the test mode, and outputs a test output voltage level ESV to the main circuit board 126. The processor circuitry 132 calculates the reserve power of the capacitor 172C based upon the changes in the test output voltage level ESV during the test mode, which will last only a short time, e.g., a fraction of a second. In an alternative method, starting from the regulated capacitor full voltage level, the test load 210 is connected to the capacitor until the capacitor voltage level decreases to a threshold voltage, and the elapsed time for this known voltage drop is used to calculate the reserve power of the fully charged capacitor. The processor circuitry 132 will compare the calculated reserve power of the capacitor 172C to the known required reserve power required for an emergency save operation, which will vary depending upon the processor circuitry 132, and the type and size of the volatile memory 130 and non-volatile memory 134, and the size of the program being run by the processor circuitry 132. If the calculated reserve power is not at least equal to the known required reserve power to complete the emergency save operation, the processor circuitry 132 will determine that the capacitor 172C of the ESM lacks sufficient reserve capacity to perform the emergency save effectively and will initiate a fault condition which can lead to an audible and/or visual (e.g., LED or the like) output from the control module 116 to indicate such fault condition, in which case the ESM can be replaced. If operating power to the main module MM is interrupted during the test mode, the processor circuitry immediately exits the test mode and initiates the emergency save operation. The test load 210 is also used for regulation of the output BKUPV of the step down converter 204, which helps to improve the accuracy of the reserve power calculated during test mode.

The capacitor ESM (ESM1) preferably further comprises a real-time clock RTC that interfaces with the main circuit board 126 including the processor circuitry 132. In the illustrated example, the real-time clock RTC is powered by a separate capacitor C2, e.g., a supercapacitor that can power the real-time clock for a minimum of five days. The real-time clock RTC comprises non-volatile memory such as an EEPROM that is used to store configuration parameters of the ESM as described further below. The real-time clock is also used to validate the overall capacity of the ESM capacitor 172C after completion of the emergency save operation, as described further below.

For safety, the capacitor based ESM (ESM1) is configured such that upon separation of the ESM from the main module MM, the capacitor 172C will automatically discharge itself, e.g., through the test load 210 as controlled by switch 212. In one embodiment, separation of the capacitor based ESM (ESM1) from the main module MM will cause the ESM to enter the above-described test mode, which will cause the stored capacitive energy to be discharged in less than one minute.

Figure 7:
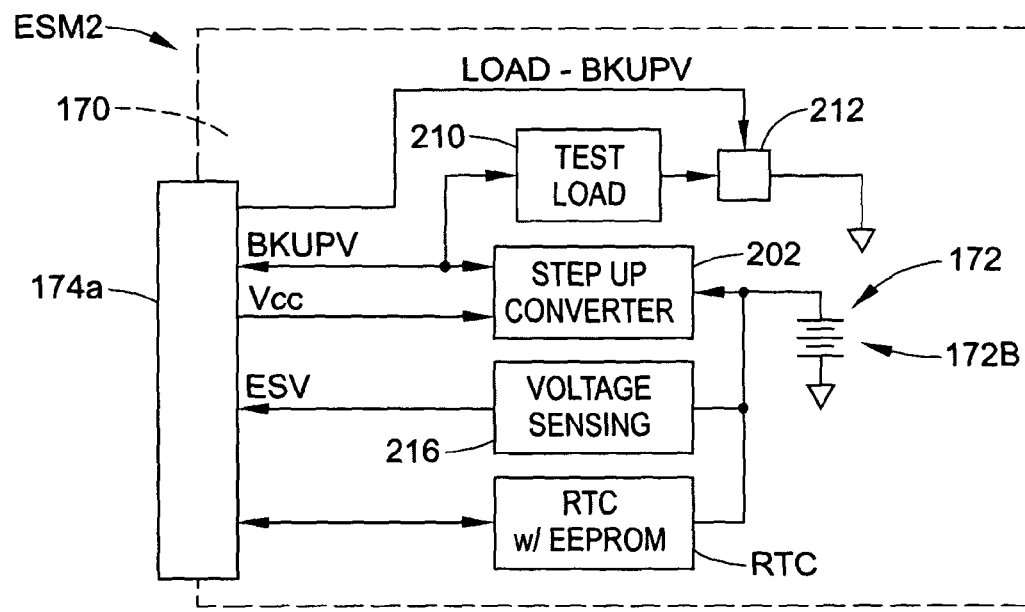
FIG. 7 is a block diagram view of the energy storage module as configured with a battery as the back-up electrical power source.

FIG. 7 is similar to FIG. 6, but shows a diagrammatic view of a battery embodiment of the ESM, designated ESM2. More particularly, the back-up power source 172 comprises a battery 172B that supplies back-up power to the controller module 116, including the main circuit board 126 and processor circuitry 132 and other components of the main module MM (and the ESM itself), in case of loss of operating power on the backplane 22 (due to interruption of the line power 24 input to the power supply module 14 or another cause) so that the emergency save operation can be completed. The back-up power circuitry of the ESM circuit board 170 is connected to the main circuit board 126 of the main module MM through the plug interface 174a/174b described above or other means for power and data transmission.

ESM input electrical power Vcc (e.g., 4.75 to 5.25 volts) is supplied to the ESM circuit board 170 sourced from the backplane operating power. If the battery 172B is rechargeable, the ESM input voltage Vcc is used to charge the battery 172B as controlled by the processor circuitry 132, optionally by boosting the ESM input voltage Vcc through a step up converter 202 (or step down of the ESM input voltage Vcc through a step down converter) if required. The battery 172B stores a back-up voltage (e.g., 3 volts) that is output to the step up converter 202 (or a step down converter 204 (FIG. 6) depending upon the voltage of the battery 172B) that outputs the back-up operating voltage BKUPV (e.g., 4 to 5 volts DC) to the controller module 116 to complete the emergency save operation.

As with the capacitor ESM (ESM1) the illustrated battery ESM (ESM2) comprises a test load 210 (e.g., a resistor) and switch means 212 controlled by the processor 132 of the main circuit board 126 through a signal LOAD_BKUPV for selectively powering the test load 210 from the boost converter 202 to measure the reserve power of the battery 172B during a test mode. A voltage sensor 216 monitors the voltage of the battery 172B during the test mode, and outputs a test output voltage level ESV to the main circuit board 126. The processor circuitry 132 calculates the reserve power of the battery 172B based upon the changes in the test output voltage level ESV during the test mode, which will last only a short time, e.g., less than one second. The processor circuitry 132 will compare the calculated reserve power to its known required reserve power for an emergency save operation, which will vary depending upon the processor circuitry 132, and the type and size of the volatile memory 130 and non-volatile memory 134, and the size of the program being run by the processor circuitry 132. If the calculated reserve power is not at least equal to the known required reserve power to complete the emergency save operation, the processor circuitry 132 will determine that the battery 172B of the ESM lacks sufficient reserve capacity to perform the emergency save effectively and will initiate a fault condition which can lead to an audible and/or visual (e.g., LED or the like) output from the control module 116 to indicate such fault condition, in which case the ESM can be replaced. If the operational power supplied from the backplane 22 to the main module MM fails during the test mode, the processor circuitry immediately terminates the test mode and initiates the emergency save operation.

The battery ESM (ESM2) preferably further also comprises a real-time clock RTC that interfaces with the main circuit board 126 including the processor circuitry 132. As shown, the real-time clock RTC is powered by the ESM battery 172B, but a separate battery or capacitor can be provided to power the real-time clock. The real-time clock RTC comprises non-volatile memory such as an EEPROM that is used to store configuration parameters of the ESM as described further below.

To preserve battery life, the battery based ESM (ESM2) is configured such that upon separation of the ESM from the main module MM, the battery is isolated from loads on the ESM circuit board 170 except the real-time clock RTC, to extend the battery life a maximum possible extent.

Both the capacitor and battery ESM (ESM1,ESM2) include non-volatile memory such as the EEPROM provided as part of the real-time clock RTC. This non-volatile memory is programmed to include configuration parameters that identify the type of back-up power source 172 in the ESM (capacitor, battery, etc.), the nominal or rated capacity of the back-up power source 172 (e.g., 220 uF, 350V capacitor or 3 volt battery, etc.). In one embodiment, the non-volatile memory of the ESM includes a serial number or like unique identifier for the ESM, so that same can be logged as part of any emergency save operation or as otherwise required. Certain of these configuration parameters can also be set using a jumper device on the ESM circuit board 170, e.g., to identify the ESM as either battery or capacitor based.

Also, during operation of the ESM, the non-volatile memory can be updated to include results from the above-described test mode with respect to the reserve power capacity of the back-up power source 172. Similarly, in the case of the capacitor based ESM (ESM1), the duration of the emergency save operation is logged by the real-time clock RTC, and the capacitor 172C is further operated with a load at least equal to that of the emergency save operation to supply back-up power (e.g., through the test load 210) after completion of the emergency save operation in order to measure any residual reserve power capacity until depletion of the capacitor, and this information is also stored to the real-time clock EEPROM or other non-volatile memory for later use in assessing or validating the maximum reserve power capacity of the capacitor relative to the power requirements of the emergency save operation. For example, upon the next power up of the controller module 116, the main module processor circuitry 132 can calculate the ratio of the duration of the emergency save operation to the total operation time of the ESM (the duration of the emergency save operation+the duration from completion of the emergency save operation to depletion of the capacitor) to validate the ESM for a the back-up power requirements (program size, memory size, etc.) of the particular main module. If the ratio is above a threshold, the ESM will be deemed to have insufficient back-up energy capacity for future use with the particular main module, i.e., the ESM will be deemed to have insufficient excess energy capacity.

The processor circuitry 132 of each main module MM can be preprogrammed to accept an ESM with only certain configuration parameters stored in the non-volatile memory of the real-time clock RTC or elsewhere. For example, if the main module MM is to be used in a mining application, the processor circuitry will be programmed to accept only a capacitor based ESM (ESM1) and to initiate a fault condition with visual and/or audible warnings if a battery based ESM (ESM2) is operatively installed in the slot 150. Similarly, the processor circuitry 132 can be programmed to accept an ESM only if the back-up power source 172 of the ESM is rated to sufficient reserve power capacity to complete an emergency save operation for the particular processor circuitry 132, type/size volatile memory, size of the program being executed by the processor circuitry and the like. Here, again, if an ESM with insufficient reserve power capacity is installed in the slot 150 of the main module MM, a fault condition will be indicated.

Figure 8:
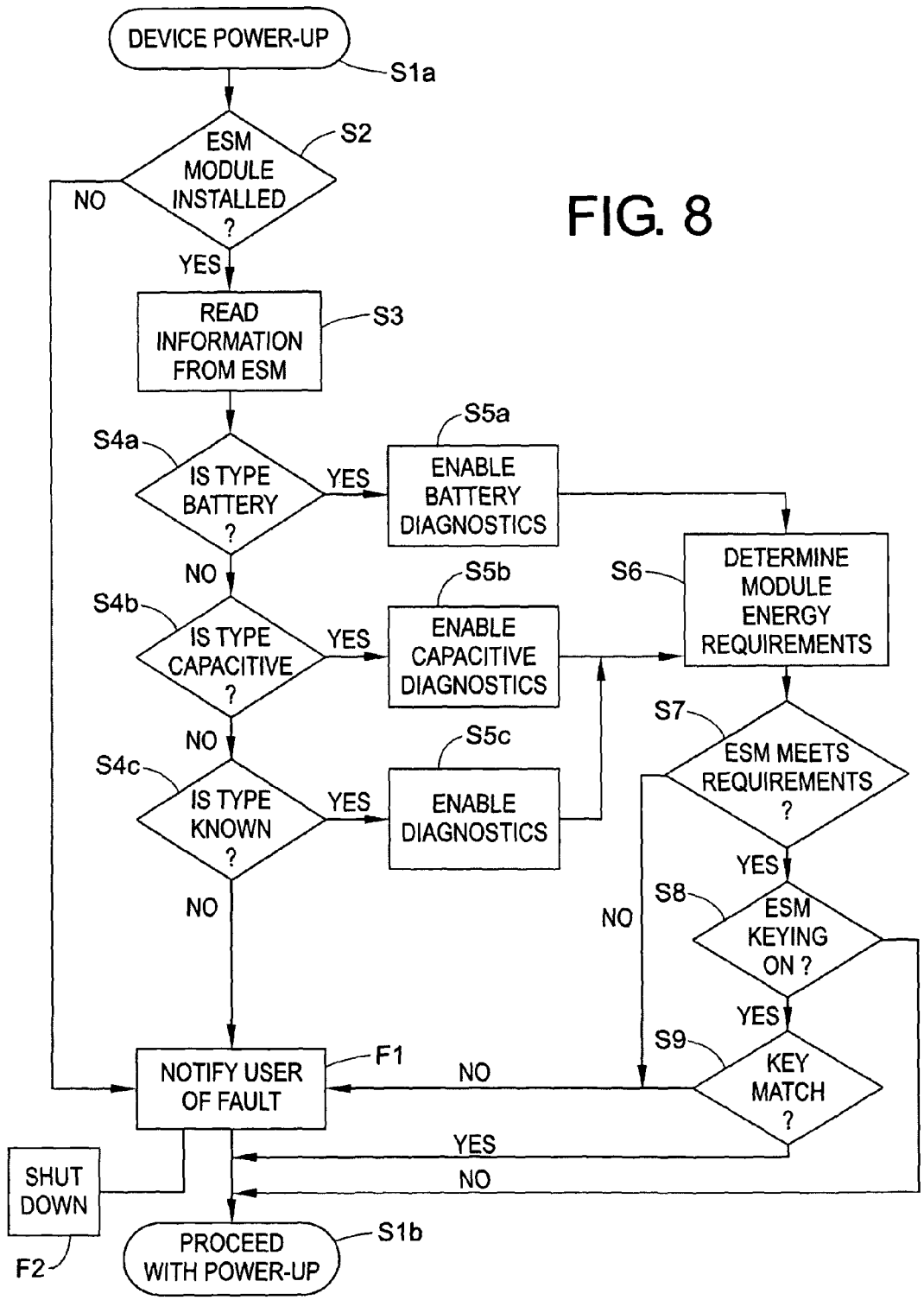
FIG. 8 is a flow chart that illustrates an example of a how a controller module identifies and validates an installed energy storage module.

FIG. 8 is a flow chart that illustrates an example of a how a controller module identifies and validates an installed energy storage module. In particular, upon initial power up S1a of the controller module 116, the processor circuitry 132 of each main module MM performs a step S2 to determine if an ESM is installed. If not, a fault step F1 is carried out by the main module circuitry 132, e.g., to notify a user of the fault by a audio and/or visual indicator. Depending upon the user's preferences or other device settings, the controller module can be shut down (fault step F2) or the power up process for the controller module 116 can continue at step S1b without the ESM. Referring again to step S2, if the ESM is installed, a step S3 is performed by the main module circuitry 132 to read information from the ESM (e.g., from the EEPROM of the real-time clock) including information such as type (e.g., battery or capacitor), nominal (rated) energy capacity (e.g., rated battery voltage or rated capacitor size), product code and/or serial number, or other configuration parameters of information. Based upon the information obtained from the ESM in step S3, the main module circuitry 132 performs steps S4a, S4b and/or S4c to determine if the ESM is a battery ESM (ESM2), a capacitor ESM (ESM1) or other known type, and depending upon the type of ESM respective steps S5a,S5b, S5c are carried out by the main module circuitry 132 to enable the appropriate diagnostics in the ESM (e.g., to initiate a battery or capacitor test mode such as described above or another diagnostic test) to determine the actual back-up energy storage of the installed ESM. For the capacitor ESM (ESM1) this will first require charging of the capacitor 172C. In a step S6, the main module circuitry 132 determines its own back-up energy requirements based upon the size of its control program and other parameters such as the size of its volatile and non-volatile memory 130,134 and the type of its processor circuitry 132, e.g., by reading user-input parameters related to program size, memory size and the like. In a step S7 the main module circuitry 132 determines if the installed ESM meets the back-up energy requirements by comparing the actual back-up energy storage of the installed ESM (determined in one of steps S5a,S5b,S5c) to the back-up energy requirements of the controller module 116 (determined in step S6). If the installed ESM fails to meet the energy requirement for the controller module, the control returns to the fault step F1 as described above. On the other hand, if the ESM meets the backup energy requirements, the main module circuitry implements a step S8 to determine if other ESM requirements are specified (i.e., electronic "keying" enabled), such as type (battery or capacitor), model type, serial number range, etc. If not, control proceeds to the power-up continuation step S1b. If keying is enabled, the main module circuitry implements a step S9 to check if all keying requirements are met. If all such keying requirements are met, control proceeds to the power-up continuation step S1b; if all such keying requirements are not met, control proceeds to the fault step F1.

The back-up power source 172 is described herein as being a capacitor 172C or a battery 172B, but those of ordinary skill in the art will recognize that other back-up power sources can be used without departing from the overall scope and intent of the present development.

It is preferred that the ESM be configured to remain inactive when first installed in the slot 150 of the main module, until such time that the ESM input power Vcc is supplied to the ESM. This will help to ensure that the ESM has been correctly installed in a main module MM prior to operation of the ESM.

In an alternative embodiment, the capacitor based ESM (ESM1), in addition or as an alternative to the above-described test mode, includes a temperature sensor for monitoring the temperature in the ESM space adjacent the capacitor 172C. For controller modules that typically run continuously, the capacity/lifetime of the capacitor 172C of the ESM can be predicted by monitoring the temperature inside the controller module 116. Temperature is a dominant factor to for determining capacitor degradation (adjustments can be made for any off time of the controller module 116). For example, a 220 uF capacitor at 350V stores 13.475 joules (J) of energy. Allowing for a 20% capacitor tolerance drops the nominal energy capacity to 10.78 J. The step down converter 204 is about 82-83% efficient, which lowers the capacity to 8.84 J. Capacitor life is rated at 12,000 hours at 105 degrees Celsius (C). Operation at every 10 C below 105 C represents an approximate doubling of capacitor life, with a capacitor lifetime equivalent to a 20% capacitance loss. Continuous 85 C operation moves the rated lifetime to 48,000 hours with a corresponding drop in capacity to 7.072 J. 96,000 hours operation at continuous 85C temperature drops capacity to 5.66 J. The ending capacitor discharge voltage of 30V loses 0.1 J., dropping available capacity to 5.56 J.

It should also be noted that some or all of the data exchanged between the ESM circuit board 170 and the main circuit board 126 can be encrypted. This can minimize the likelihood of unauthorized access to data in the ESM, and can also help to ensure that unauthorized ESM modules cannot be used in order to improve safety and performance.

The development has been described with reference to preferred embodiments. Those of ordinary skill in the art will recognize that modifications and alterations to the preferred embodiments are possible. The disclosed preferred embodiments are not intended to limit the scope of the following claims, which are to be construed as broadly as possible, whether literally or according to the doctrine of equivalents.

The invention claimed is:
1. An industrial automation controller module comprising:
a main module comprising processor circuitry, volatile memory, and non-volatile memory, wherein said processor circuitry, volatile memory, and non-volatile memory are electrically powered by operating power;

an energy storage module removably connected to the main module and adapted for selective manual separation from the main module, said energy storage module comprising a back-up power source;

wherein said back-up power source of said energy storage module selectively supplies back-up power to said processor circuitry, volatile memory and non-volatile memory of said main module for an emergency save operation in which data from at least one of said processor circuitry and said volatile memory are saved to said non-volatile memory in response to interruption of said operating power;

wherein said energy storage module includes one or more configuration parameters related to said back-up power source that enables the main module to validate the energy storage module for requirements of the main module.

2. The industrial automation controller module as set forth in claim 1, wherein said energy storage module and said main module comprise respective plug connectors that operatively mate when said energy storage module is physically connected to said main module and that separate when said energy storage module is separated from said main module.

3. The industrial automation controller module as set forth in claim 2, wherein said main module comprises a slot adapted to receive said energy storage module, and wherein said main module and said energy storage module comprise respective mechanical features that must be mated for said energy storage module to be physically connected to said main module.

4. The industrial automation controller module as set forth in claim 3, wherein said energy storage module comprises a latch that mates with a catch of said main module to releasably capture said energy storage module to said main module when said energy storage module is physically connected to said main module.

5. The industrial automation controller module as set forth in claim 3, wherein said energy storage module comprise a face plate that at least partially overlies a front wall of said main module, said face plate comprising at least one opening defined therein to provide access to a corresponding feature located on said front wall of said main module.

6. The industrial automation controller module as set forth in claim 5, wherein said corresponding features located on said front wall of said main module comprises at least one of a key switch and a connector.

7. The industrial automation controller module as set forth in claim 1, wherein said back-up power source comprises a battery.

8. The industrial automation controller module as set forth in claim 7, wherein said battery comprises a rechargeable battery that is charged by said operating power from said main module when said energy storage module is physically connected to said main module.

9. The industrial automation controller module as set forth in claim 7, wherein said energy storage module comprises:

a step up converter connected to said battery for increasing an output voltage of said battery to a backup voltage level required for said backup power.

10. The industrial automation controller module as set forth in claim 7, wherein said energy storage module comprises:

a step down converter connected to said battery for reducing an output voltage of said battery to a backup voltage level required for said backup power.

11. The industrial automation controller module as set forth in claim 7, further comprising:

a test load, wherein said processor circuitry of said main module periodically initiates a test mode in which said test load is connected to said backup power; and, a voltage sensor for measuring a voltage charge of the battery during said test mode and outputting a test output voltage level.

12. The industrial automation controller module as set forth in claim 11:

wherein said processor circuitry of said main module computes a reserve power value of said battery based upon changes in the test output voltage level during the test mode; and, wherein the processor circuitry compares the calculated reserve power value to a known required reserve power value need to complete said emergency save operation and initiates a fault condition if said calculated reserve power value is less than said required reserve power value.

13. The industrial automation controller module as set forth in claim 7, wherein said energy storage module automatically initiates a storage mode in which an electrical load on said battery is minimized when said energy storage module is separated from said main module to preserve battery life.

14. The industrial automation controller module as set forth in claim 1, wherein said main module further comprises means for identifying at least one configuration parameter of said energy storage module, wherein said at least one configuration parameter includes at least one of: type of said back-up power source; nominal energy capacity of said back-up power source; product code of said energy storage module; serial number of said energy storage module; prior actual measured energy capacity of said energy storage module.

15. The industrial automation controller module as set forth in claim 14, wherein said main module comprises means for initiating a fault in said controller module if at least one identified parameter of said energy storage module does not match a predetermined configuration parameter requirement stored in said main module.

16. The industrial automation controller module as set forth in claim 15, wherein said means for initiating a fault disables said controller module if at least one identified parameter of said energy storage module does not match a predetermined configuration parameter requirement stored in said main module.

17. An industrial automation controller module comprising:

a main module comprising processor circuitry, volatile memory, and non-volatile memory, wherein said processor circuitry, volatile memory, and non-volatile memory are electrically powered by operating power;

an energy storage module removably connected to the main module and adapted for selective manual separation from the main module, said energy storage module comprising a back-up power source;

wherein said back-up power source of said energy storage module selectively supplies back-up power to said processor circuitry, volatile memory and non-volatile memory of said main module for an emergency save operation in which data from at least one of said processor circuitry and said volatile memory are saved to said non-volatile memory in response to interruption of said operating power;

said main module further comprising a slot adapted to receive said energy storage module, and said main module and said energy storage module comprising respective mechanical features that must be mated for said energy storage module to be physically connected to said main module;

said energy storage module comprising a face plate that at least partially overlies a front wall of said main module, said face plate comprising at least one opening defined therein to provide access to a key switch located on said front wall of said main module, said at least one opening defined in said face plate is conformed and dimensioned such that an associated key installed in said key switch prevents separation of said energy storage module from said main module.

18. An industrial automation controller module comprising:

a main module comprising processor circuitry, volatile memory, and non-volatile memory, wherein said processor circuitry, volatile memory, and non-volatile memory are electrically powered by operating power;

an energy storage module removably connected to the main module and adapted for selective manual separation from the main module, said energy storage module comprising a back-up power source;

wherein said back-up power source of said energy storage module selectively supplies back-up power to said processor circuitry, volatile memory and non-volatile memory of said main module for an emergency save operation in which data from at least one of said processor circuitry and said volatile memory are saved to said non-volatile memory in response to interruption of said operating power, wherein said back-up power source comprises a capacitor that is charged by said operating power from said main module when said energy storage module is physically connected to the main module, and wherein said capacitor supplies said back-up power.

19. The industrial automation controller module as set forth in claim 18, wherein said energy storage module comprises:

a step up converter for increasing said operating power to a charging voltage for said capacitor; and, a step down converter for regulating a backup voltage of said backup power supplied by said capacitor.

20. The industrial automation controller module as set forth in claim 19, further comprising:

a test load, wherein said processor circuitry of said main module periodically initiates a test mode in which said test load is connected to said backup power through said step down converter; and, a voltage sensor for measuring the voltage charge of the capacitor during said test mode and outputting a test output voltage level.

21. The industrial automation controller module as set forth in claim 20:

wherein said processor circuitry of said main module computes a reserve power value of said capacitor based upon changes in the test output voltage level during the test mode; and, wherein the processor circuitry compares the calculated reserve power value to a known required reserve power value need to complete said emergency save operation and initiates a fault condition if said calculated reserve power value is less than said required reserve power value.

22. The industrial automation controller module as set forth in claim 20, wherein said energy storage module automatically initiates a discharge mode in which said capacitor is discharged when said energy storage module is separated from said main module, wherein said capacitor is discharged through said test load during said discharge mode.

23. The industrial automation controller module as set forth in claim 21, wherein said test load is used by said step down converter for regulating a backup voltage of said backup power supplied by said capacitor.

24. The industrial automation controller module as set forth in claim 20, wherein said energy storage module automatically initiates a discharge mode in which said capacitor is discharged when said energy storage module is separated from said main module.

25. The industrial automation controller module as set forth in claim 18, further comprising a temperature sensor for monitoring an internal temperature in said controller module, wherein said monitored internal temperature is used to predict a reserve power value for said capacitor.

26. The industrial automation controller module as set forth in claim 18, further comprising:

means for measuring elapsed time between a completion of said emergency save operation and depletion of back-up power in said capacitor, wherein said means for measuring comprises means for electrically loading said capacitor between completion of said emergency save operation and depletion at a level at least equal to an electrical load on said capacitor during said emergency save operation;

means for saving said measured elapsed time.

27. A removable energy storage module comprising:

a housing configured for selectively releasably mating with an associated main module;

a back-up power source supported by the housing;

a first connector operatively connected to said back-up power source and adapted to mate with a second connector of the associated main module for electrical transmission between the associated main module and the energy storage module;

wherein said back-up power source of said energy storage module selectively supplies back-up power to the associated main module for completing an emergency save operation in which the associated main module saves data to non-volatile memory;

wherein said energy storage module includes one or more configuration parameters related to said back-up power source that enables the main module to validate the energy storage module for requirements of the main module.

28. The removable energy storage module as set forth in claim 27, further comprising:

at least one mechanical feature defined by said housing and adapted to mate with a corresponding mechanical feature of the associated main module in order for said housing of said energy storage module to mate with the associated main module.

29. The removable energy storage module as set forth in claim 27, wherein said back-up power source comprises a battery and said energy storage module further comprises means for minimizing electrical load on said battery when said energy storage module is disconnected from an associated main module.

30. The removable energy storage module as set forth in claim 27, further comprising:

a test load;

means for selectively connecting said back-up power source to said test load to test said back-up power source.

31. The removable energy storage module as set forth in claim 27, further comprising a selectively releasable latch adapted to mate with a catch of the associated main module to releasably capture said energy storage module to the associated main module.

32. The removable energy storage module as set forth in claim 27, wherein said housing comprises a face plate adapted to at least partially overlie a front wall of the associated main module, said face plate comprising at least one opening defined therein to provide access to a corresponding feature located on said front wall of the associated main module.

33. The removable energy storage module as set forth in claim 27, further comprising a real time clock powered by said back-up power source or another power source of said energy storage module.

34. A removable energy storage module comprising:
a housing configured for selectively releasably mating with an associated main module;
a back-up power source supported by the housing;
a first connector operatively connected to said back-up power source and adapted to mate with a second connector of the associated main module for electrical transmission between the associated main module and the energy storage module;
a voltage sensor for sensing a voltage output by the back-up power source;
wherein said back-up power source of said energy storage module selectively supplies back-up power to the associated main module for completing an emergency save operation in which the associated main module saves data to non-volatile memory.

35. The removable energy storage module as set forth in claim 34, further comprising a non-volatile memory for saving at least one of: (i) configuration parameters related to said back-up power source; (ii) actual historical operating performance of said back-up power source.

36. A removable energy storage module comprising:
a housing configured for selectively releasably mating with an associated main module;
a back-up power source supported by the housing;
a first connector operatively connected to said back-up power source and adapted to mate with a second connector of the associated main module for electrical transmission between the associated main module and the energy storage module;
a non-volatile memory for saving at least one of: (i) configuration parameters related to said back-up power source; (ii) actual historical operating performance of said back-up power source;
wherein said back-up power source of said energy storage module selectively supplies back-up power to the associated main module for completing an emergency save operation in which the associated main module saves data to non-volatile memory.

37. The removable energy storage module as set forth in claim 36, wherein said configuration parameters comprise at least one of: type of said back-up power source; nominal energy capacity of said back-up power source; product code of said energy storage module; serial number of said energy storage module; prior actual measured energy capacity of said energy storage module.

38. A method of supplying back-up power to processor circuitry of a main module of an industrial automation controller module for said processor circuitry to complete an emergency save operation, said method comprising:
physically connecting an energy storage module to the main module and electrically connecting a back-up power source and back-up power circuitry of the energy storage module to the processor circuitry of the main module;
receiving a signal from said processor circuitry of said main module into said back-up power circuitry of said energy storage module that back-up power from said back-up power source is required for an emergency save operation;
in response to said signal, supplying back-up power from said back-up power source to said processor circuitry of said main module for said emergency save operation; and
saving at least one of: (i) configuration parameters related to said back-up power source; (ii) actual historical operating performance of said back-up power source, in a non-volatile memory of the energy storage module.

39. The method as set forth in claim 38, wherein said step of electrically connecting said back-up power source and back-up power circuitry of the energy storage module to the processor circuitry of the main module comprises mating respective plugs of the energy storage module and the main module when said energy storage module is physically connected to said main module.

40. The method as set forth in claim 38, further comprising:
validating said energy storage module for use with said main module based upon at least one configuration parameter stored in said back-up power circuitry of said energy storage module.

41. The method as set forth in claim 40, wherein said at least one configuration parameter comprises at least one of: type of said back-up power source; nominal energy capacity of said back-up power source; product code of said energy storage module; serial number of said energy storage module; prior actual measured energy capacity of said back-up power source of said energy storage module.

42. The method as set forth in claim 41, initiating a fault condition in said processor circuitry of said main module if said at least one configuration parameter stored in said energy storage module does not match a predetermined configuration parameter requirement stored in said processor circuitry of said main module.

43. The method as set forth in claim 38, further comprising measuring a duration of said emergency save operation and saving said duration in non-volatile memory.

44. The method as set forth in claim 43, wherein said back-up power source comprises a capacitor and said method further comprises:
measuring elapsed time between completion of said emergency save operation and depletion of back-up power from said capacitor;
saving said elapsed time in non-volatile memory.

45. The method as set forth in claim 38, wherein said back-up power source comprises a battery, and said method further comprises minimizing an electrical load on said battery when said energy storage module is physically and electrically disconnected from said main module.

46. The method as set forth in claim 38, wherein said back-up power source comprises a capacitor, and said method further comprises:
charging said capacitor using operating power supplied from said main module;
depleting said back-up power from said capacitor when said energy storage module is physically and electrically disconnected from said main module.

47. A removable energy storage module comprising:
a housing configured for selectively releasably mating with an associated main module;

a back-up power source supported by the housing;

a first connector operatively connected to said back-up power source and adapted to mate with a second connector of the associated main module for electrical transmission between the associated main module and the energy storage module;

wherein said back-up power source of said energy storage module selectively supplies back-up power to the associated main module for completing an emergency save operation in which the associated main module saves data to non-volatile memory;

said back-up power source comprising a capacitor that supplies said back-up power, and said energy storage module further comprising means for dissipating power from said capacitor when said energy storage module is disconnected from the associated main module.

48. The removable energy storage module as set forth in claim 47, wherein said energy storage module comprises:

a step up converter for input of an operating voltage from said first connector and output of a charging voltage for charging said capacitor; and, a step down converter for regulating a backup voltage of said backup power supplied by said capacitor.

* * * * *